(12) United States Patent
Kishore et al.

(10) Patent No.: US 11,644,801 B2
(45) Date of Patent: May 9, 2023

(54) DATA CENTER COLLECTIVE ENVIRONMENT MONITORING AND RESPONSE

(71) Applicant: Dell Products L.P., Round Rock, TX (US)

(72) Inventors: Saurabh Kishore, Round Rock, TX (US); Jeffrey Lairsey, Round Rock, TX (US); Sudhir Shetty, Cedar Park, TX (US); Alex Rote, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 16/840,098

(22) Filed: Apr. 3, 2020

(65) Prior Publication Data
US 2021/0311509 A1    Oct. 7, 2021

(51) Int. Cl.
*G05B 13/00*    (2006.01)
*G05B 13/02*    (2006.01)
(Continued)

(52) U.S. Cl.
CPC .......... *G05B 13/024* (2013.01); *G01K 13/00* (2013.01); *H04L 43/045* (2013.01)

(58) Field of Classification Search
CPC ...... G05D 13/62; G01K 13/00; G05B 13/024; H04L 43/045; H04L 43/08; H04L 41/0816
See application file for complete search history.

(56) References Cited

U.S. PATENT DOCUMENTS

| | | | | |
|---|---|---|---|---|
| 2007/0005292 A1* | 1/2007 | Jin | ......................... | G01S 5/0289 |
| | | | | 702/150 |
| 2008/0266794 A1* | 10/2008 | Malone | .............. | H05K 7/20836 |
| | | | | 361/695 |

(Continued)

OTHER PUBLICATIONS

Koriem, S., M. Bayoumi, and S. Nouh. "Circles Routing Protocol for Wireless Sensor Network." International Journal of Intelligent Computing and Information Sciences 16.2 (2016): 21-36. (Year: 2016).*

(Continued)

*Primary Examiner* — Michael D Masinick
(74) *Attorney, Agent, or Firm* — Terrile, Cannatti & Chambers; Stephen A. Terrile

(57) ABSTRACT

A mechanism is provided for utilizing localized clusters within a mesh network to aid in tracking environmental factors associated with information handling systems in an environment having a large number of information handling systems installed. Sensors within each information handling system measure a variety of environmental factors, such as, for example, temperature (CPU, ambient, air inlet, air exhaust, system board, and the like), air flow through the information handling system, fan speed, and hardware utilization. The sensor-derived environmental information is provided to a lead local cluster node, which can provide local responses to environmental values exceeding thresholds. Lead nodes generate a mapping of the environmental factors and provide that mapping to a data center management server. The data center management server collates environmental mapping information to derive a data center-wide environmental mapping used by management personnel to make adjustments to balance load, reduce temperatures, and reduce energy usage.

11 Claims, 7 Drawing Sheets

(51) Int. Cl.
  H04L 43/045 (2022.01)
  G01K 13/00 (2021.01)

(56) References Cited

U.S. PATENT DOCUMENTS

| | | | | |
|---|---|---|---|---|
| 2013/0130734 | A1* | 5/2013 | Rice | H04W 24/00 |
| | | | | 455/517 |
| 2013/0191676 | A1* | 7/2013 | Mase | G06F 1/3203 |
| | | | | 713/340 |
| 2019/0324432 | A1* | 10/2019 | Cella | H04L 67/1097 |

OTHER PUBLICATIONS

Jain, Neeraj, P. Sinha, and S. K. Gupta. "Clustering protocols in wireless sensor networks: A survey." International Journal of Applied Information System (IJAIS) 5.2 (2013). (Year: 2013).*

R. Khanna, H. Liu and T. Rangarajan, "Wireless Data Center Management: Sensor Network Applications and Challenges," in IEEE Microwave Magazine, vol. 15, No. 7, pp. S45-S60, Nov./Dec. 2014. (Year: 2014).*

Kaur, Harpinder, Navjot Kaur, and Sandeep Waraich. "Comparative analysis of clustering protocols for wireless sensor networks." International Journal of Computer Applications 115.1 (2015). (Year: 2015).*

Chrungoo, Addwiteey, et al. "On adaptive HVAC based on a De-Centralized algorithm using K: 1 transmission protocol for Autonomous Wireless Sensor Network." 2010 Sixth International conference on Wireless Communication and Sensor Networks. IEEE, 2010. (Year: 2010).*

Manjeshwar, Arati, and Dharma P. Agrawal. "APTEEN: A hybrid protocol for efficient routing and comprehensive information retrieval in wireless sensor networks." Parallel and distributed processing symposium, international. vol. 3. IEEE Computer Society, 2002. (Year: 2002).*

Choochaisri, Supasate, et al. "SENVM: Server environment monitoring and controlling system for a small data center using wireless sensor network." arXiv preprint arXiv: 1105.6160 (2011). (Year: 2011).*

Pagan, Josué, et al. "A Cyber-Physical approach to combined HW-SW monitoring for improving energy efficiency in data centers." Conference on Design of Circuits and Integrated Systems. 2013. (Year: 2013).*

H. Kim, J. Lee and J. W. Jang, "BLEmesh: A Wireless Mesh Network Protocol for Bluetooth Low Energy Devices," 2015 3rd International Conference on Future Internet of Things and Cloud, 2015, pp. 558-563, doi: 10.1109/FiCloud.2015.21. (Year: 2015).*

Darroudi, Seyed Mahdi, and Carles Gomez. "Bluetooth low energy mesh networks: Asurvey." Sensors 17.7 (2017): 1467. (Year: 2017).*

Mittal, Mohit, and Krishan Kumar. "Data clustering in wireless sensor network implemented on self organization feature map (SOFM) neural network." 2016 International Conference on Computing, Communication and Automation (ICCCA). IEEE, 2016. (Year: 2016 ).*

Jeffrey Lairsey et al., System and Method for Determining Location and Navigating a Datacenter using Augmented Reality and Available Sensor Data, U.S. Appl. No. 16/263,968, filed Jan. 31, 2019.

* cited by examiner

DATA CENTER COLLECTIVE ENVIRONMENT MONITORING AND RESPONSE

BACKGROUND OF THE INVENTION

Field of the Invention

The present invention relates to information handling systems. Specifically, embodiments of the invention relate to gathering information related to environmental factors in a data center and tracking and displaying information related to those environmental factors in a manner that allows for rapid and automated response.

Description of the Related Art

As the value and use of information continues to increase, individuals and businesses seek additional ways to process and store information. One option available to users is information handling systems. An information handling system generally processes, compiles, stores, or communicates information or data for business, personal, or other purposes thereby allowing users to take advantage of the value of the information. Variations in information handling systems allow for information handling systems to be general or configured for a specific user or specific use such as transaction processing, airline reservations, enterprise data storage, or global communications. In addition, information handling systems can include a variety of hardware and software components that can be configured to process, store, and communicate information and may include one or more computer systems, data storage systems, and networking systems. Further, information handling systems can be incorporated in a variety of environments, including, for example, desktop devices, mobile devices, and large data center configurations with hundreds-to-thousands of information handling systems in multiple environmentally controlled rooms.

In a data center environment where there can be thousands of information handling systems, managing and tracking such systems presents challenges to data center management. These challenges can include, for example, maintaining current information regarding the environment of the data center, including subregions of the data center, and providing a mechanism for responding to such environmental factors.

SUMMARY OF THE INVENTION

A system, method, and computer-readable medium are disclosed for utilizing localized clusters within a mesh network to aid in tracking environmental factors associated with information handling systems in an environment having a large number of information handling systems installed.

In one embodiment, an information handling system is provided that includes a processor, one or more sensors coupled to the processor and configured to measure a first environmental characteristic, a wireless network interface coupled to the processor and configured to communicate with a wireless mesh network in a data center, and a non-transitory, computer-readable storage medium embodying computer program code where the non-transitory, computer-readable storage medium is coupled to the processor and the computer program code interacts with a plurality of computer operations and includes instructions executable by the processor. The instructions are configured to cause the processor to: collect data associated with the first environmental characteristic from the one or more sensors; transmit the data associated with the first environmental characteristic to a cluster lead node using the wireless network interface where the information handling system is a member of a local cluster of nodes in the wireless mesh network and the cluster lead node is the lead node of the local cluster of nodes; and, transmit a first threshold exceeded message to the cluster lead node when the data associated with the first environmental characteristic exceeds a threshold associated with the first environmental characteristic.

In one aspect of the above embodiment, the first environmental characteristic includes one of processor temperature, air inlet temperature, exhaust temperature, ambient temperature, humidity, and fan speed. In another aspect of the above embodiment, the local cluster of nodes in the wireless mesh network includes one or more mesh network nodes within a fixed radius of the cluster lead node. In yet another aspect of the above embodiment, the cluster lead node is configured to communicate directly with each node in the local cluster of nodes and directly with cluster lead nodes of neighboring clusters. In a further aspect, the cluster lead node is further configured to communicate with a data center management server.

In another aspect of the above embodiment, the instructions further include instructions configured to cause the processor to: receive via the wireless network interface from the cluster lead node a command to adjust an operational parameter in response to the data associated with the first environmental characteristic, and adjust the operational parameter in response to the command. In a further aspect, the operational parameter includes one or more of a periodicity of sensor measurements of the first environmental characteristic, a granularity of sensor measurements of the first environmental characteristic, and a speed of a fan in an enclosure of the information handling system.

Another embodiment provides an information handling system configured as a cluster lead node of a local cluster of network nodes that are members of a wireless mesh network. The information handling system includes a processor, a wireless network interface coupled to the processor and configured to communicate with a wireless mesh network in a data center where the wireless mesh network includes one or more network nodes that are members of the local cluster of nodes, a second network interface coupled to the processor and a second network and configured to communicate with a data center management system coupled to the second network, and a non-transitory, computer-readable storage medium embodying computer program code, the non-transitory, computer-readable storage medium coupled to the processor, the computer program code interacting with a plurality of computer operations and including instructions executable by the processor. The instructions are configured to cause the processor to: receive, from one or more global cluster nodes via the wireless network interface, data associated with a first environmental characteristic at each of the one or more local cluster node; generate a mapping of the first environmental characteristic where the mapping associates the first environmental characteristic value with the corresponding local cluster node location; and, transmit, using the second network interface, the mapping of the first environmental characteristic to the data center management system.

In one aspect of the above embodiment, the first environmental characteristic is a temperature associated with each of the one or more local cluster nodes. In another aspect of the above embodiment, the instructions executable by the processor further include instructions configured to cause the processor to receive, from the one or more local cluster nodes, via the wireless interface, a threshold exceeded message associated with the first environmental characteristic where the threshold exceeded message indicates that the first environmental characteristic exceeds a dynamic threshold value associated with the corresponding local cluster node. In a further aspect, instructions are further configured to cause the processor to, in response to the threshold exceeded message, determine an operational parameter adjustment for a subset of the one or more local cluster nodes if a local adjustment is configured, and transmit the operational parameter adjustment to the subset of the one or more local cluster nodes. In another further aspect, the instructions are further configured to cause the processor to, in response to the threshold exceeded message, transmit the threshold exceeded data to the data center management system, and transmit an operational parameter adjustment to a subset of the one or more local cluster nodes if the operational parameter adjustment is received from the data center management system. In a further aspect, the operational parameter adjustment is associated with the mapping of the first environmental characteristic and the threshold exceeded data.

In another aspect of the above embodiment, the instructions are further configured to cause the processor to, in response to the threshold exceeded message and if the first environmental characteristic is a temperature: transmit a request for temperature data from neighbor cluster lead nodes; determine fan speed adjustments for one or more local cluster and neighbor cluster nodes; transmit the fan speed adjustments to the one or more local cluster nodes associated with the adjustment; and, transmit the fan speed adjustments to the neighbor cluster lead nodes.

In another embodiment, a data center management system is provided that includes a wireless mesh network including one or more local clusters of mesh network nodes that each include a cluster lead node, and a data center management server coupled to the wireless mesh network and configured to communicate with the cluster lead nodes. Each local cluster includes a cluster lead node configured to communicate directly with each mesh network node in the cluster and with each neighbor cluster lead node, and one or more mesh network nodes configured to communicate directly with the cluster lead node and physically located within a predetermined radius of the cluster lead node. Each mesh network node is configured to transmit data associated with an environmental characteristic to the associated cluster lead node. Each cluster lead node is configured to generate a mapping of the environmental characteristic. The cluster lead nodes are further configured to transmit the cluster mapping of the environmental characteristic to the data center management server. The data center management server is configured to generate a global mapping of the data center for the environmental characteristic from the cluster mappings of the environmental characteristic.

In one aspect of the above embodiment, the data center management server is further configured to determine operational parameter adjustments for mesh network nodes in response to the global mapping for the environmental characteristic, and transmit the operational parameter adjustments to the implicated cluster lead nodes. In a further aspect, the implicated cluster lead nodes are further configured to transmit the operational parameter adjustments to implicated cluster member mesh network nodes. In yet a further aspect, the operational parameter is one of fan speed and speed of a processor of a mesh network node.

In another aspect of the above embodiment, the data center management system further includes a mobile service device communicatively coupled to the data center management server. The mobile service device is configured to receive the global mapping information from the data center management server and display the global mapping information is a visual overlay on a video image of a portion of the data center. In another aspect, the environmental characteristic is one of processor temperature, motherboard temperature, air inlet temperature, exhaust temperature, and ambient temperature.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for utilizing localized clusters within a mesh network to aid in tracking environmental factors associated with information handling systems in an environment having a large number of information handling systems installed. In one embodiment, each information handling system is incorporated into a Bluetooth Low Energy (BLE) mesh network to enable the systems to form localized clusters within the mesh network. Embodiments provide sensors within each information handling system to measure a variety of environmental factors, such as, for example, temperature (CPU, ambient, air inlet, air exhaust, system board, and the like), air flow through the information handling system, fan speed, and hardware utilization. Embodiments provide the sensor-derived environmental information to a lead cluster node, which can provide local responses to environmental values exceeding thresholds.

Lead nodes can also generate a mapping of the environmental factors (e.g., a temperature map) and provide that mapping to a data center management server. The data center management server can collate environmental mapping information to derive a data center-wide environmental mapping that can then be used by management personnel to make adjustments within the data center to balance load, reduce temperatures, and reduce energy usage. The data center management server can also provide the data center-wide environmental mapping to a mobile service platform that can display the mapping information using augmented reality protocols.

For purposes of this disclosure, an information handling system includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
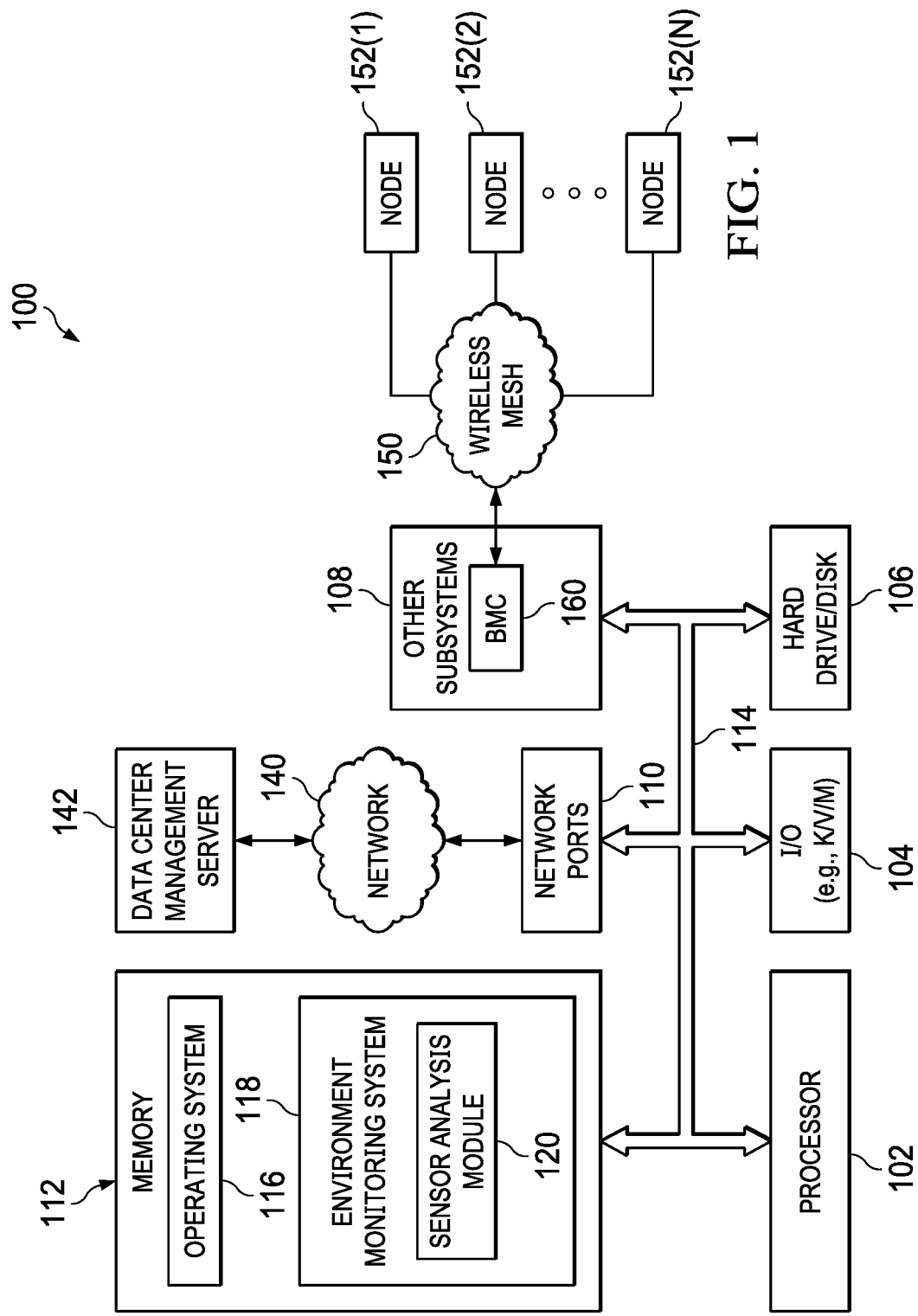
FIG. 1 is a generalized illustration of an information handling system that can be used to implement the system and method of the present invention.

FIG. 1 is a generalized illustration of an information handling system 100 that can be used to implement the system and method of the present invention. Information handling system 100 includes one or more processors (e.g., one or more processing cores or a central processor unit (CPU)) 102, input/output (I/O) devices 104, such as a display, a keyboard, a mouse, and associated controllers, a hard drive or disk storage 106, sensors (e.g., temperature, humidity, fan speed, air flow, noise, and the like) 107, and various other subsystems 108, including a baseboard management controller (BMC) 160. In various embodiments, information handling system 100 also includes one or more network ports 110 providing communication interfaces to network nodes external to the information handling system. One example of a network port includes a network interface card (e.g., Ethernet) operable to connect to a network 140, which is likewise accessible by a data center management server 142. Information handling system 100 likewise includes system memory 112, which is interconnected to the foregoing via one or more buses 114. System memory 112 further comprises operating system 116 and in various embodiments may also comprise environment monitoring system 118.

Baseboard management controller (BMC) 160 provides out of band monitoring, maintenance, and control of various elements of information handling system 100. BMC 160 can incorporate a processing device distinct from processors 102 that provides various management functions for the information handling system. For example, BMC 160 can be responsible for power management, cooling management, and the like. "Baseboard management controller" is a term often used in the context of server systems, while in a consumer-level device, a BMC can be referred to as an embedded controller. A BMC included in a data storage system can be referred to as a storage enclosure processor, while a BMC included at a chassis of a blade server can be referred to as a chassis management controller and embedded controllers included in blades of a blade server can be referred to as blade management controllers. As illustrated, BMC 160 is coupled to a wireless communication interface, such as a Bluetooth or Bluetooth Low Energy (BLE) channel or other wireless mesh network capable protocol. A BLE channel network port is wirelessly coupled to a wireless mesh network 150 that is likewise accessible to nodes 152(1)-(N), and allows for communication between BMC 160 and similar baseboard management controllers of nodes 152(1)-(N). In other embodiments, a wireless communication interface can be coupled to BMC 160 via a network port 110.

Capabilities and functions provided by BMC 160 vary based on the type of information handling system. BMC 160 can operate in accordance with an Intelligent Platform Management Interface (IPMI). One example of BMC 160 includes an integrated Dell Remote Access Controller (iDRAC). BMC 160 can communicate with various portions of information handling system 100 using one or more buses 114. BMC 160 utilizes various protocols and application programming interfaces (APIs) to direct and control processes for monitoring and maintaining information handling system 100. Examples of a protocol or API for monitoring and maintaining the system includes a graphical user interface, an interface defined by the Distributed Management Taskforce (DMTF) (e.g., Web Services Management (WS-MAN) or Management Component Transport Protocol (MCTP)), various vendor defined interfaces (e.g., Dell EMC Remote Access Controller Administrator (RACADM), Dell EMC OpenManage Server Administrator (OMSS), or Dell EMC OpenManage Deployment Toolkit (DTK)), and the like.

Environment monitoring system 118 performs environmental monitoring internal to the information handling system as well as external to the information handling system and communicates that information to data center management server 142.

Environmental monitoring system 118 is also configured to receive instructions from network nodes external to the information handling system (e.g., a mesh cluster lead node or data center management server 142) and to adjust system environmental handling parameters in response to such instructions, as will be discussed in further detail below. Sensor analysis modules 120 are associated with each type of environmental sensor coupled to bus 114 and are configured to query the sensors for the environmental data and perform initial analysis of the environmental data. The environmental monitoring operations improve overall performance of the data center (and thus the efficiency of the information handling system 100) by allowing for automated, real-time environmental monitoring and response thereto, allowing for avoidance of temperature-related damages and for reduction in energy consumption throughout the data center.

Figure 2:
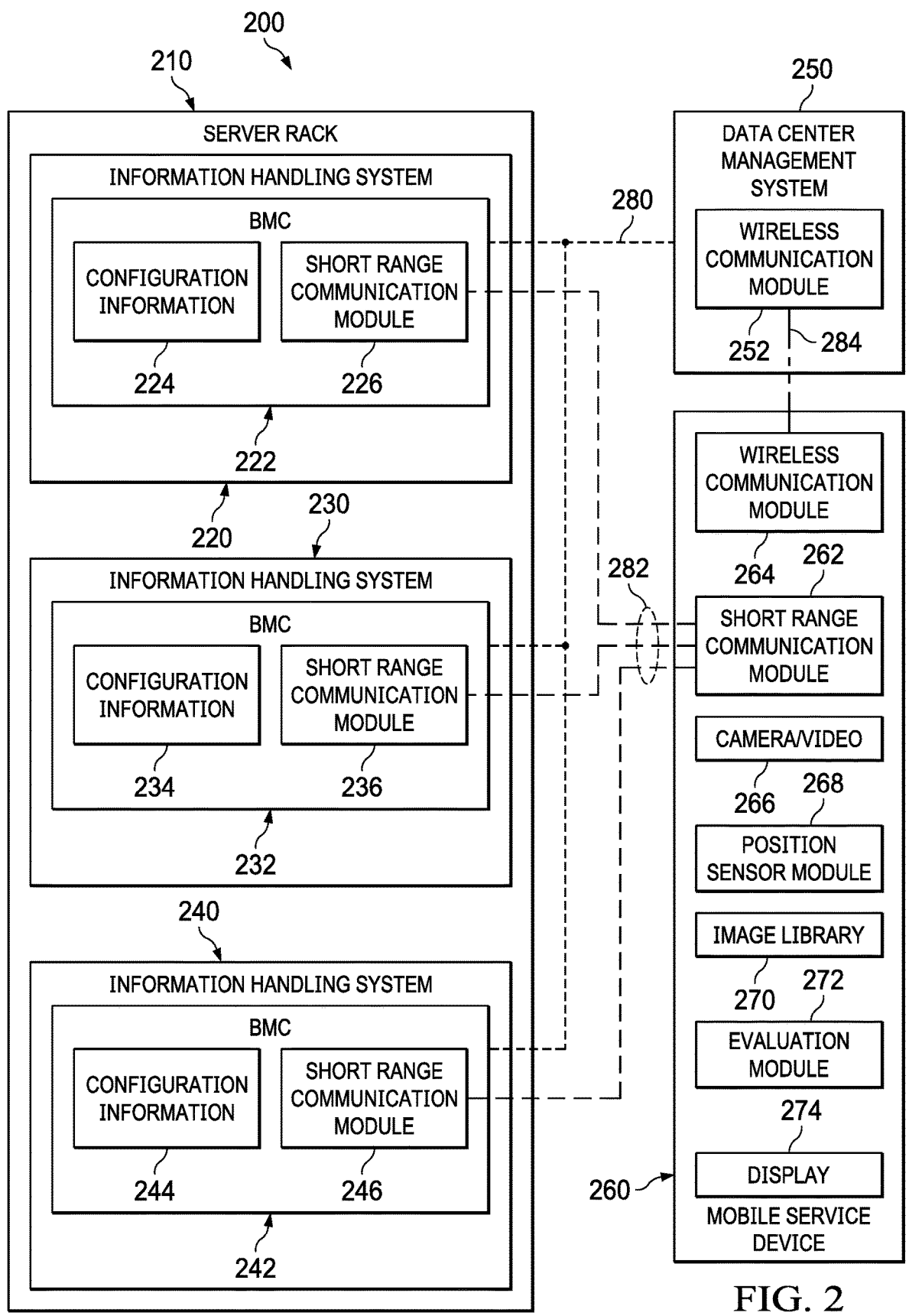
FIG. 2 is a simplified block diagram illustrating a portion of a data center, including a server rack, a data center management system, and a mobile service device.

FIG. 2 is a simplified block diagram illustrating a portion of a data center 200, including a server rack 210, a data center management system 250, and a mobile service device 260. Server rack 210 includes information handling systems 220, 230, and 240. Information handling systems 220, 230, and 240 can each represent variety of computing equipment such that illustrated by information handling system 100 in FIG. 1. As an example, information handling system 220 can be a top-of-rack switch, information handling system 230 can be a blade server, and information handling system 240 can be a storage server. Information handling systems 220, 230, and 240 can each include a hosted processing environment (not shown) that is configured to provide the processing tasks particular to the information handling system. Information handling systems 220, 230, and 240 each include a BMC 222, 232, and 242, respectively. Each BMC includes a network interface such that the BMCs are all connected together in a management network 280 with data center management system 250. Management network 280 can be a wired network, a wireless network, or a combination of wired and wireless networks, as determined by the application.

Each BMC includes configuration information (e.g., 224, 234, and 244) and a short-range communication module (e.g., 226, 236, and 246). The configuration information provides management information utilized by data center management system 250 to monitor, manage, and maintain the associated information handling system. Configuration information can include information about the physical configuration of the respective information handling system (e.g., 220, 230, and 240), and can also include information regarding the logical configuration of the information handling system. For example, where the information handling system is a blade server, the physical configuration information can include the make and model of the server, a service tag, a number of blades, and other physical information associated with the server. Configuration information can further include location information for the blade server in server rack 210 and for the server rack in data center 200. Logical configuration information can also include, for example, information associated with the health of the blade server in terms of physical operational status and in terms of logical operational status such as error and alert status information, and can also include information as to the installed operating systems, the workloads and processing tasks being performed by the blades, and other information that identifies uses to which the blade server is configured to perform.

Short-range communication modules 226, 236, and 246 include a wireless communication endpoint configured to establish a wireless communication link 282 to other similarly equipped devices (e.g., neighboring information handling systems (as will be discussed more fully below) and mobile service device 260). The short-range communication modules are configured to provide short connection range as compared with other wireless technologies, such as Wi-Fi or wireless cellular technologies. An example of a short-range communication module includes, for example, a communication endpoint communicating in accord with a Bluetooth standard, a Bluetooth low energy (BLE) standard, or another short-range communication standard, as implicated by the application. Embodiments of the present system provide a short-range communication standard supporting a wireless mesh network incorporating location capabilities.

Data center management system 250 is a centralized and unified processing resource for monitoring, managing, and maintaining information handling systems (e.g., 220, 230, and 240) through management network 280. Data center management system 250 can include a wireless communication module 252 configured to establish a wireless communication link 284 to another similarly equipped device (e.g., mobile service device 262). Wireless communication module 252 is configured to provide a medium connection range as compared with other wireless technologies, such as wireless cellular technologies. An example of such a medium-range communication module can include a communication endpoint configured in accord with various Wi-Fi standards, or another medium-range communication standard, as indicated by the application.

Mobile service device 260 is a device utilized by service technicians of data center 200 to perform monitoring, management, service, and maintenance of information handling systems (e.g., 220, 230, and 240), and can include, a mobile device such as a tablet, smart phone, and the like. Mobile service device 260 includes short-range communication module 262, wireless communication module 264, a camera/video system 266, an accelerometer module 268, and equipment image library 270, and augmented reality evaluation module 272, and a display 274.

Short-range communication module 262 establishes communication links 282 with short-range communication modules associated with the information handling systems (e.g., short-range medication modules 226, 236, and 246). Wireless communication module 264 can establish a communication link 284 with wireless communication module 252 of data center management system 250.

Camera/video system 266 is an integrated device of mobile service device 260 configured to obtain still or motion-based images from surroundings of the mobile service device. Position sensor module 268 is an integrated device that operates to track the motion of mobile service device 260 in three-dimensional space. From a particular location, position sensor module 268 can determine a relative location to which the mobile service device has been moved based upon accelerations experienced by the mobile service device. The position sensor module locates the mobile service device within data center 200 and can include a Global Positioning System (GPS) sensor to assist in determination of the location of the mobile service device or a mechanism for triangulating to determine location based upon establishment of one or more communication links similar to communication links 282 and 284. Position sensor module 268 can also include a gyroscope sensor to determine orientation of mobile service device 260, as needed.

Image library 270 includes information storage for image objects representing various data center equipment found in data center 200. Image objects in image library 270 can be provided by, for example, a manufacturer of data center equipment, where each image object is associated with a particular piece of data center equipment or particular family of data center equipment. A specific image object can provide in a primitive form the visible features of a specific type of information handling system (e.g., a top-of-rack switch). Image objects can also include other types of visibly distinguishing information such as QR codes, barcodes, service tags, or other information serving to visually identify the various equipment. Image library 270 can also include database information associated with each image object. The database information can include, for example, name, product code, SKU, or other information identifying the specific type of equipment, such as a number of network ports, associated switch fabric, speed, and throughput information, and the like. In general, the image objects and associated database information stored in image library 270 is available for comparison with the image data from the field of view of camera/video system 266 to assist evaluation module 272 in determining a location of mobile service device 260.

Evaluation module 272 provides and augmented reality visual depiction of surroundings of the mobile service device overlaid on display 274. Augmented reality visual display is generated by evaluation module 272 based upon various inputs to mobile service device 260, including image data from camera/video system 266, location information from position sensor module 268, configuration information from one or more of information handling systems 220, 230, and 240 received by a communication links 282, from data center management system 250 received via communication link 284, or from other input information available to the mobile service device. Specifically, evaluation module 272 operates to identify the data center equipment within server rack 210. Evaluation module 272 can then present image information from camera/video system 268 on display 274 and then, having matched the correct image objects to the elements of server rack 210, projects an augmented reality overlay of the matched image objects onto their respective elements of the server rack. In addition to the projected image objects, evaluation module 272 can display associated identifying information in the projected image objects that identifies the various elements of the server rack. In some embodiments, evaluation module 272 will display environmental information in the augmented reality overlays so that data center personnel using mobile service device 260 can more efficiently determine those systems needing reconfiguration or moving in order to improve the temperature, air flow, and other environmental factors of the data center.

Figure 3:
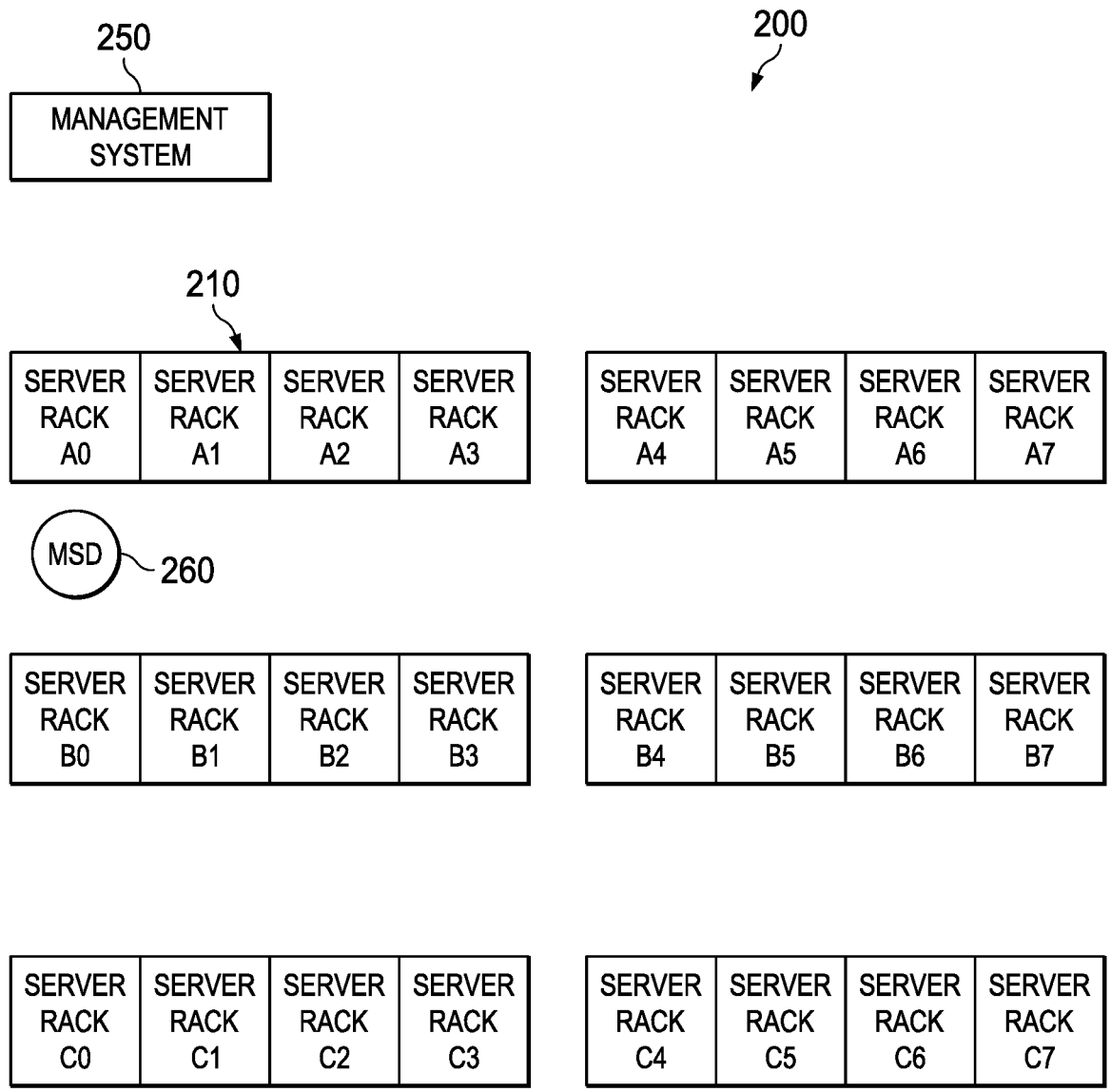
FIG. 3 is a simplified block diagram illustrating an expanded view of data center, including server rack, data center management system, and mobile service device, as shown in FIG. 2.

FIG. 3 is a simplified block diagram illustrating an expanded view of data center 200, including server rack 210, data center management system 250, and mobile service device 260, shown in FIG. 2. Data center 200 is depicted as including three rows of server racks. Each row is depicted as including eight server racks similar to server rack 210, with an aisle between each row of server racks. Additionally, each row of server racks includes an alley that permits data center technicians to move between rows. As illustrated, mobile service device 260 is located in front of server rack 210. As will be discussed more fully below, the additional location information provided by embodiments the present system allows for improvement in the ability for data center equipment to be reliably identified and located by data center management system 250 and mobile service device 260 within the various server racks of data center 200.

Embodiments of the present system utilize short-range communication to establish a localized mesh network to aid in determining location of a new or relocated information handling system within a data center. Bluetooth Low Energy (BLE) is an example of a mesh protocol that enables nodes within a mesh to communicate with each other using message-oriented protocol. The mesh network can be used for local neighborhood monitoring of systems introduced into the mesh. Utilizing relative directional location capabilities of BLE, an information handling system provided to the mesh can determine the system's location in relation to previously existing nodes within the mesh network. Embodiments can utilize this information to find a closest vertical node in the mesh network to automatically aid the newly introduced system in determining the identity of a rack within which the system has been installed. That rack identifying information, in conjunction with information provided to the newly introduced information handling system regarding available slots in the rack and other location information, enables the system to determine where the system is located within the rack and, hence, the data center and to provide that information to a data center management system.

Figure 4:
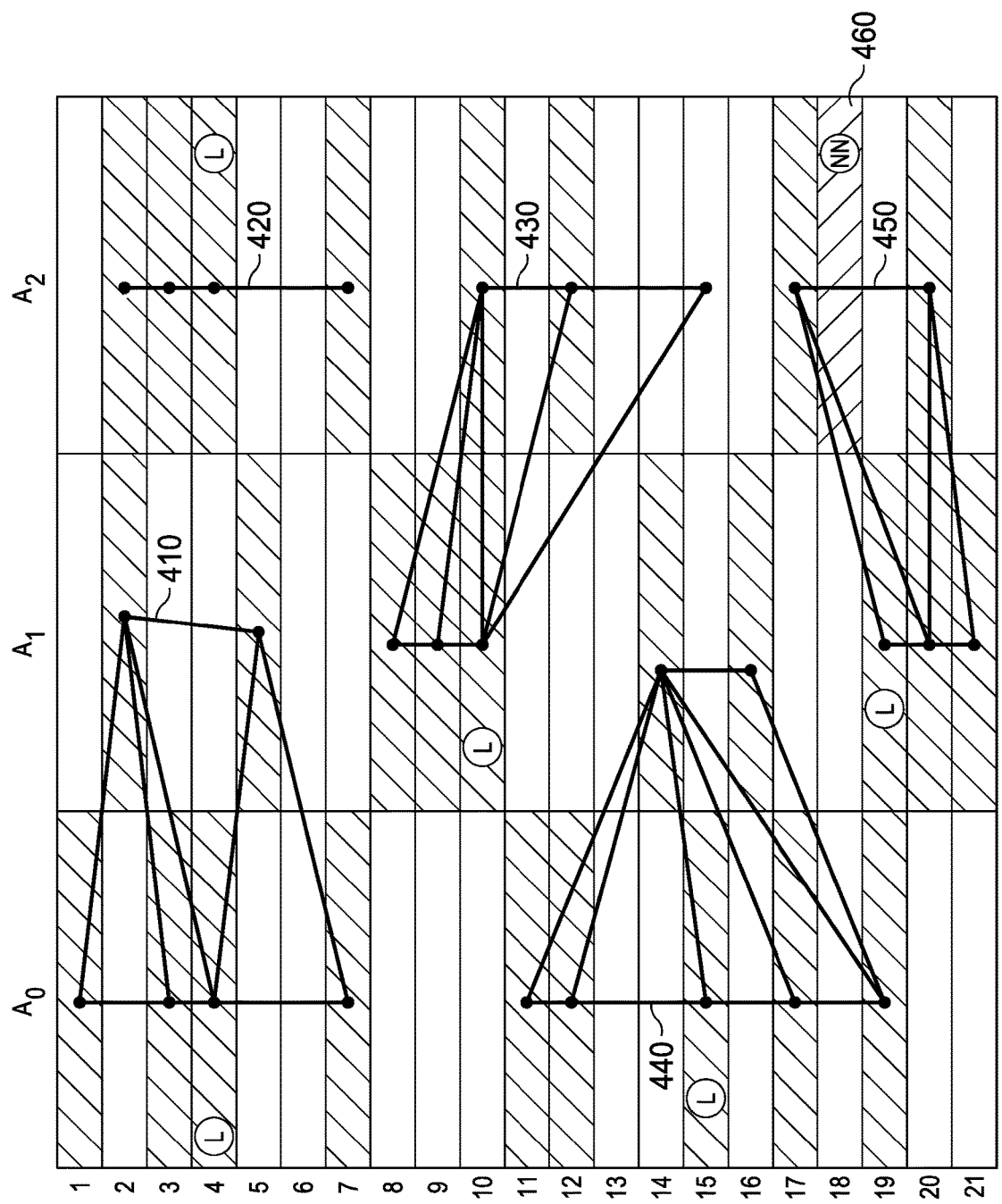
FIG. 4 is a simplified block diagram illustrating an example set of server racks and their system slots with an example of mesh network cluster formation.

FIG. 4 is a simplified block diagram illustrating an example of a set of server racks and their system slots, along with an example of how nodes interact during mesh network cluster formation. Three server racks A0, A1, and A2 are illustrated where each rack has 21 available slots for information handling systems. Typically, a server rack can have mounted systems of differing heights and widths that can change a number of available slots within the server rack, but for sake of demonstration the illustrated slots are of a same height and width. Filled server rack slots are shaded in the illustration (e.g., slots [A0,1], [A1,8], and [A2,12] are filled with an information handling system [e.g., information handling system 100]). Empty server rack slots are not shaded (e.g., [A0,5], [A1,7], and [A2,6] are empty slots). As is known in the art, server racks provide both a physical location for a mounted information handling system and power couplings for those systems.

As discussed above, each information handling system includes a short-range communication module (e.g., 226, 236, and 246) that communicates wirelessly with one or more nodes within a certain distance of the system. Such communication is used to form a wireless mesh network, such as a BLE mesh network. In the server racks illustrated, each installed information handling system can be a member of a mesh network encompassing the entire data center.

To allow for location determination, the mesh network is divided into smaller neighborhoods, or clusters. Each information handling system listens for BLE signals of neighborhood devices. The information handling system then filters these signals for nearby devices based on a threshold for distance. For example, in a data center in which the server rack aisles (e.g., server rack aisles A and B in FIG. 3) are separated by 0.75 m, the threshold distance can be 0.5 m in order to avoid a neighborhood crossing from one server rack aisle to the next. Depending upon a density of installed systems, it may be desirable to reduce a threshold distance. Threshold distance can be determined based upon a data center set up. Alternatively, threshold distance can be determined automatically based upon local area density data populated by the information handling system. FIG. 4 illustrates five different clusters 410 420, 430, 440, and 450. Clusters can be generated using one of a number of clustering methodologies, including k-means clustering. k-means clustering is a vector quantization method that partitions n instances into k clusters in which each instance belongs to a cluster with a nearest mean that serves as a prototype for the cluster. There are a variety of known methods for performing k-means clustering in the art and embodiments of the present invention are not limited to a particular one of those methods. In one embodiment, k is determined using a divisive k search in which k is initialized as the number of nodes, k clusters are formed using k means, if all nodes are covered then k is reduced and clusters are formed again, otherwise k is increased and k clusters are formed again.

For each cluster, lead nodes and backup lead nodes are selected. The lead node is the mesh network node closest to a centroid of the cluster, while backup leads are assigned based on how close a mesh network node is to the centroid. As will be discussed in further detail below, a lead node plays an important role in inter- and intra-cluster communication. Embodiments provide that a lead node is responsible for relaying information to each node within a cluster, neighboring lead nodes, and the data center management system, as well as accumulating information regarding nodes in a cluster. As illustrated in FIG. 4, lead nodes for each cluster are as follows: [A0,4] (410), [A2,4] (420), [A1,10] (430), [A0,15] (440), and [A1,19] (450).

Figure 5:
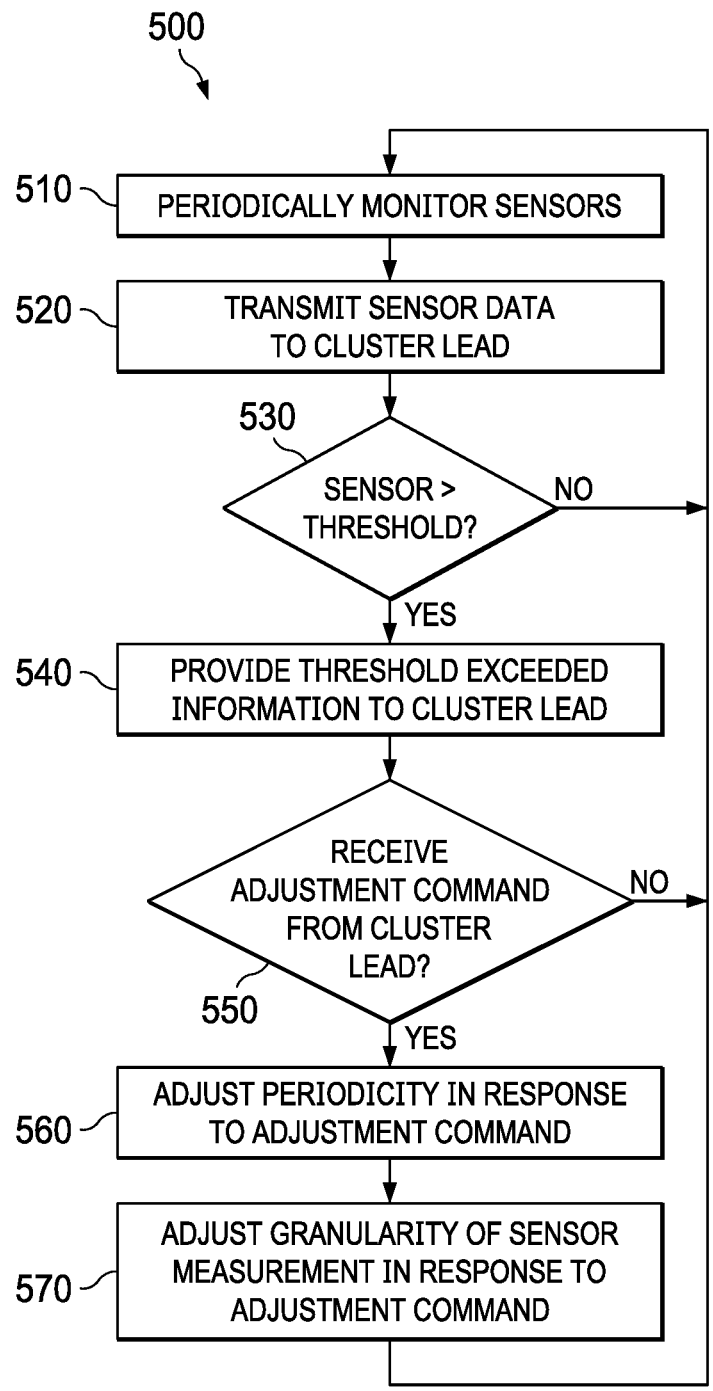
FIG. 5 is a simplified flow diagram illustrating an example process 500 executed by an information handling system for providing sensor data to a cluster lead node and responding to adjustment comments from the lead node, in accord with embodiments of the present invention.

FIG. 5 is a simplified flow diagram illustrating an example process 500 executed by an information handling system for providing sensor data to a cluster lead node and responding to adjustment comments from the lead node, in accord with embodiments of the present invention. While the information handling system is powered on, sensor analysis modules 120 periodically monitor sensors internal to and external to the information handling system (510). Such sensors can include temperature sensors in a variety of locations, such as, for example, on one or more processors 102, at an air intake, at an air exhaust, mounted externally on the case of the information handling system, and on a motherboard or daughterboard of the information handling system. In addition, sensors can include humidity sensors, RPM sensors for system fans, power consumption sensors, and the like. Sensors should be associated with environmental factors that affect the operation of the information handling system or are indicative of performance issues of the information handling system.

Once the sensor data is gathered, the sensor data is transmitted to the cluster lead node (520). The sensor data can be raw data collected from the various sensors, coupled with sensor identification or sensor type, or the sensor data can be analyzed sensor data selected to reduce a data flow to the lead node from all the cluster nodes. A determination can be made as to whether any of the sensor data has exceeded a threshold value (530). Threshold values are dynamically determined by the lead node in light of present cluster sensor values and information provided to the lead node by data center management server 142, communicated by the cluster lead node to the cluster nodes, and stored at the cluster node for reference by sensor analysis modules 120. Thresholds are set for various sensor data to be indicative of a potential problem (e.g., excessive temperature or problematic airflow) of which data center management should be made aware. Thresholds are dynamically determined in order to compensate for overall shifts in the environmental situation. For example, if a data center, or a portion of a data center, is running hotter than a threshold for temperature will be increased dynamically. Rules for such dynamic increases can be provided to the lead nodes for local dynamic determination by the data center management server. Such rules can also include a maximum difference from a base value (e.g., temperature threshold can vary from a base value by up to 10%).

If no sensor data exceeds the threshold, then sensor monitoring continues. If a sensor data exceeds an associated threshold, then threshold exceeded information is provided to the cluster lead (540). Determining that a threshold is exceeded and then providing that information to the cluster lead nodes by cluster nodes reduces processing load on the cluster lead node, thereby making responses to such information quicker. After providing the threshold exceeded information to the cluster lead, the information handling system may receive an adjustment command from the cluster lead node (550). Adjustment commands can include, for example, a command to adjust periodicity of sensor measurements for the implicated sensor in order to determine if the environmental factor is changing rapidly, which may be indicative of a problem needing immediate attention. Another adjustment command could be to adjust granularity of the sensor measurement to get a more exact value of the environmental factor. If no such adjustment command is received, then sensor monitoring continues. If an adjustment command is received, then the sensor analysis module can adjust periodicity of sensor measurements in response to the adjustment command (560) and adjust granularity of the sensor measurements in response to the adjustment command (570). Embodiments are not limited to performing just these types of adjustments, and other types of adjustment commands can be received (e.g., adjust a fan speed or reduce a CPU clock to compensate for high temperatures). Monitoring in light of the new periodicity or granularity can then continue after the adjustment (510).

Figure 6:
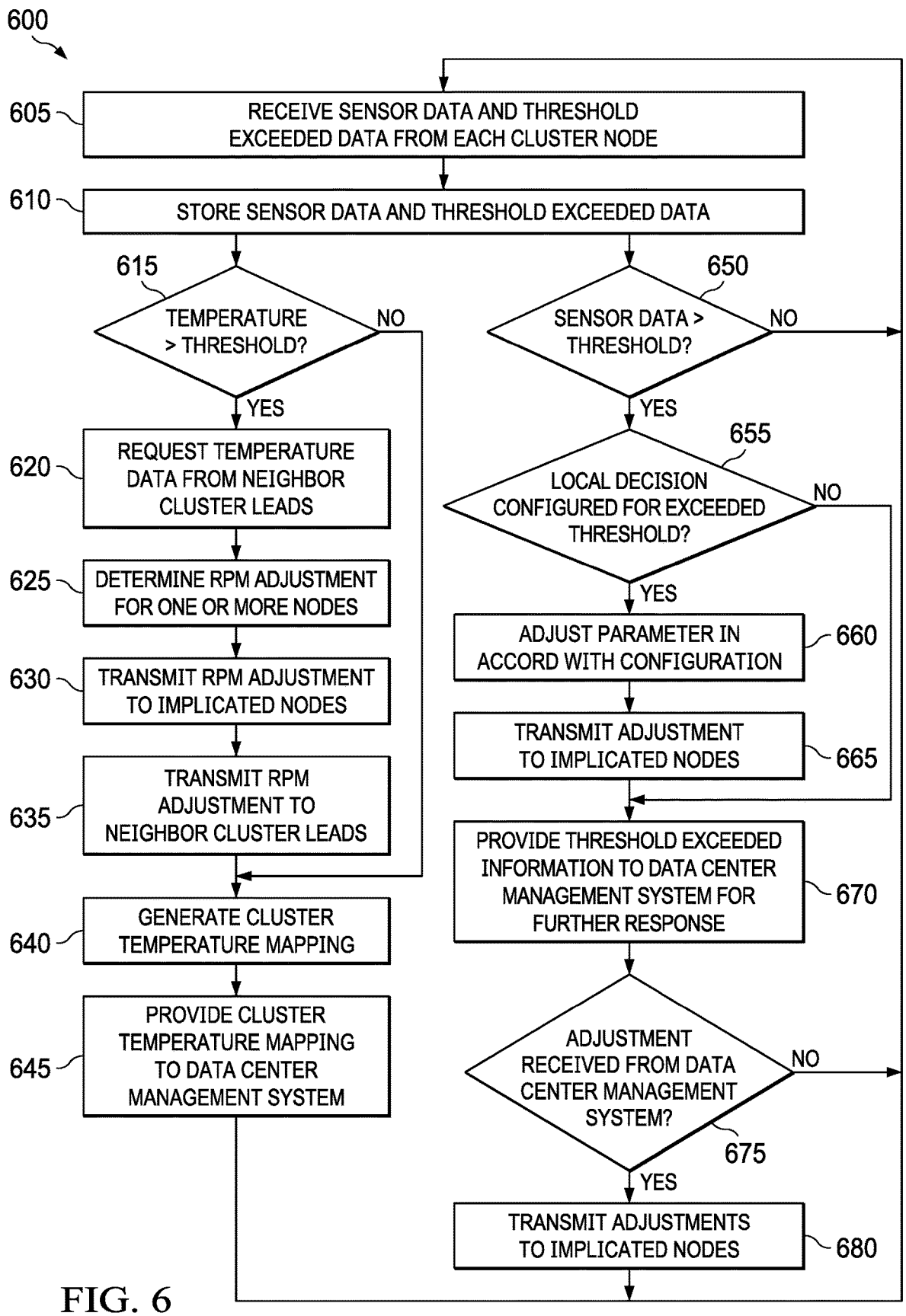
FIG. 6 is a simplified flow diagram illustrating an example process 600 executed by a cluster lead node to respond to sensor data received from other cluster nodes, in accord with an embodiment of the present invention.

FIG. 6 is a simplified flow diagram illustrating an example process 600 executed by a cluster lead node to respond to sensor data received from other cluster nodes, in accord with an embodiment of the present invention. As discussed above with regard to FIG. 5, cluster nodes transmitted sensor data to the cluster lead node upon periodically monitoring various sensors associated with the cluster node. The cluster lead node receives the sensor data and threshold exceeded data from each cluster node (605) and then stores the answer data and threshold exceeded data for further analysis and manipulation (610).

As illustrated, the cluster lead node analyzes the received data in different ways. FIG. 6 provides a specific process for handling temperature-related data versus another receives sensor data. Other embodiments and for each data received by the cluster lead and embodiments are not limited to a number of different manners in which received sensor data can be analyzed and manipulated.

For temperature-related data, a determination is made as to whether a measured temperature exceeds a predetermined threshold for that measured temperature (615). As discussed above, the originating cluster node can make the determination as to whether a threshold is exceeded and provides that information to the cluster lead. In this manner, processing associated with thresholds can be distributed among the cluster nodes, rather than handled entirely by the cluster lead node. In other embodiments, however, the cluster lead node can perform comparisons between received sensor data and predetermined thresholds. If a temperature exceeds a predetermined threshold, the cluster lead node can then coordinate with other cluster lead the to determine whether adjustments in airflow should be made clusters in the local area. The cluster lead node can request temperature data from neighbor cluster lead nodes (620). The cluster lead can then determine fan speed adjustments for one or more nodes in the cluster of the cluster lead node and in neighboring clusters (625). The cluster lead node can then transmit the fan speed adjustments to the implicated nodes (630) or the cluster lead node of a cluster having a node for which the fan speed should be adjusted (635), which can then transmit the fan adjustment message to implicated nodes in the associated clusters.

If the temperature does not exceed a predetermined threshold (615), fan speed adjustments are not performed by a cluster temperature mapping can be generated (640). The cluster temperature mapping is provided to the data center management system by the cluster lead node (645). As will be discussed more fully below, the data center management system uses the cluster temperature maps from throughout the data center to generate a temperature mapping of the entire data center. Once a cluster temperature mapping has been provided to the data center management system, the cluster lead node is ready to receive subsequent sensor data from the cluster nodes.

For other sensor data, a determination is made as to whether any of the sensor data exceeds a predetermined threshold (650). Again, this determination can be made at the originating cluster node with a threshold exceeded message provided to the cluster lead node, or the determination can be made at the cluster lead node. If a threshold is not exceeded, then the cluster lead node is ready to receive subsequent sensor data from the cluster nodes. If a threshold is exceeded, then a determination is made as to whether a local decision is preconfigured for the exceeded threshold (655). If a local decision is preconfigured, then the cluster lead node can adjust an operational parameter of the cluster node in accord with the configuration (660). For example, if a cooling fan of a cluster node is functioning outside of a normal operational range, then an adjustment to cooling fan speed can be determined by the cluster lead node. Likewise, if a noise level in or near a cluster node is too loud, adjustments to cooling fan speed can be determined by the cluster lead node. The operational parameter adjustments are then transmitted to the implicated cluster nodes (665).

If no local decision is configured, or once the parameter is adjusted, the threshold exceeded information is provided to the data center management system for further response or analysis (665). For example, if a storage device is being accessed too frequently, the data center management can be informed so that a determination can be made by data center personnel of whether heavily accessed data should be moved to another storage device. In response to this information, the data center management system can provide an operational parameter adjustment, either automatically or from data center management personnel. If such an adjustment is received (675), then those adjusted operational parameters are transmitted to the implicated nodes (680) and the cluster lead node is ready to receive additional sensor data from the cluster nodes. If no adjustment is received, then the cluster lead node returns to receiving additional sensor data from the cluster nodes.

Figure 7:
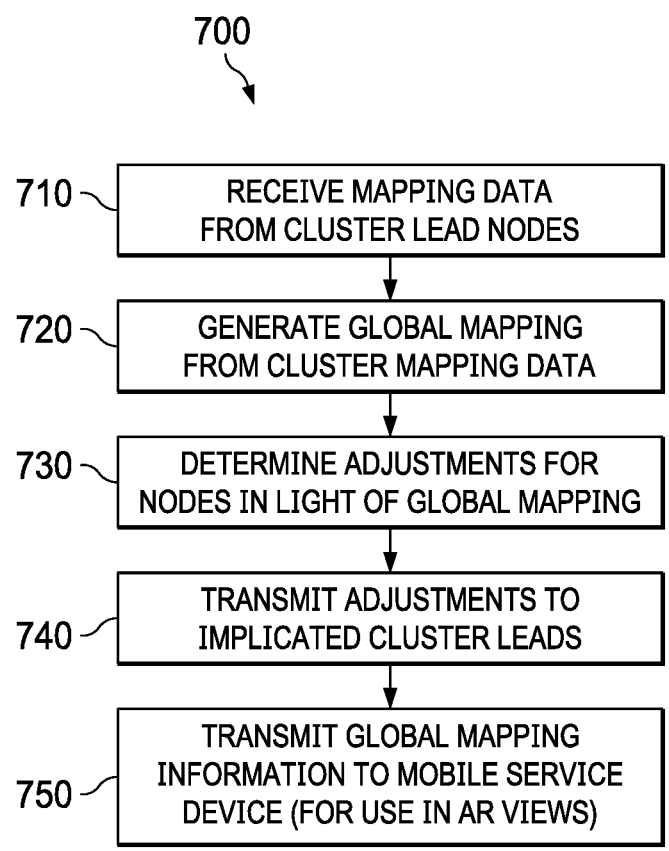
FIG. 7 is a simplified flow diagram illustrating an example process 700 executed by a data center management system to respond to data received from cluster lead nodes, in accord with an embodiment of the present invention.

FIG. 7 is a simplified flow diagram illustrating an example process 700 executed by a data center management system to respond to data received from cluster lead nodes, in accord with an embodiment of the present invention. As discussed above, cluster lead nodes can transmit mapping data associated with a type of sensor to the data center management system. The data center management system receives that mapping data (710) and can then use that cluster-associated mapping data to generate a global mapping of the data center (720). The data center management system can assemble the global mapping by having relative locations of all the clusters through the location protocols of the wireless mesh network, discussed above. The data center management system can generate the mapping using, for example, the temperatures of the various nodes along with a linear interpolation (e.g. a finite difference-type model) between the nodes or a spline interpolation (e.g., a two-spline weighted intersection model) to estimate the temperatures between the nodes. Depending upon the data being mapped (e.g., temperature, disk usage, air flow), the mapping can incorporate interpolation between known values or just use the point values.

Once a global mapping is generated, the data center management system can determine whether there are adjustments to the data center or individual nodes within the data center that need to be made in light of that global mapping (730). For example, if a region of the data center is warmer than other regions, fans on the units in that area can have their speed increased. Alternatively, environmental systems, such as an HVAC system, can have their cooling air flow increased in that area, especially if additional sensor data indicates that the fans for units in that area are already near maximum speed. In another example, if noise levels of a region of the data center are high, but the temperature levels are low, then the fans can of those servers can be reduced in speed, which will save cost and reduce noise. On the other hand, if the temperature levels are near burnout thresholds, then to save hardware and keep services running (e.g., virtual machines), those servers may need to be repaired or replaced. A global mapping can show disk usage along with life expectancy of the storage device. If a storage device is nearing end of life, the data stored on the storage device can be moved to alternate storage devices, and the older units flagged for replacement. The data center management system can automatically make recommendations for replacement and provide that information to data center management personnel.

If adjustments to system operational parameters are indicated by the data center management system, those adjustments are transmitted to the cluster lead nodes for further transmission to the implicated cluster nodes (740). The implicated cluster nodes can make the adjustments in light of the information provided by the data center management system, as discussed above with regard to FIG. 5. The data center management system can also transmit the global mapping information to a mobile service device (e.g., 260), such as that discussed above with regard to FIG. 2. The mobile service device can use the mapping information in an augmented reality (AR) display generated by evaluation module 272. Data center management personnel will be able to view and monitor environmental issues interactively using the AR display (e.g., a heat map can be overlaid on a displayed image of the portion of the data center the mobile service device camera (e.g., 266) picks up. Personnel can then act on the recommendation or the displayed mapping and view how those actions affect the displayed portion of the data center in real time.

Embodiments of the present system provide a mechanism by which location-related information associated with various information handling systems installed within a data center can automatically be determined and communicated with a data center management system. Once this information is provided to the data center management system, the data can be used to perform multiple interactions from a management perspective including, for example, actions based on location or room or rack or aisle. Such automated inventory information is additionally useful in conjunction with mobile service devices (e.g., 260) when a user requires a view of what racks have location information populated, and if not, then assigning such information when viewing the rack. Utilizing this information in an augmented reality set up, such as that described above, provides empty slot information to data center management personnel and can recommend empty slots for insertion of new servers. In addition, in light of the real-time nature of embodiments of the present system, fast response can be made by data center management when an information handling system disappears from the mesh network, either due to benign or malicious means.

As will be appreciated by one skilled in the art, aspects of the present invention may be embodied as a method, system, or computer program product. Accordingly, aspects may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of embodiments of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are well adapted to attain the advantages mentioned as well as others inherent therein. While the present disclosure has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts.

The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. An information handling system comprising:
   a processor;
   one or more sensors, coupled to the processor, and configured to measure a first environmental characteristic;
   a wireless network interface, coupled to the processor, and configured to communicate with a wireless mesh network in a data center, the wireless mesh network enabling the information handling system to communicate with other nodes of the wireless mesh network using a message-oriented protocol; and
   a non-transitory, computer-readable storage medium embodying computer program code, the non-transitory, computer-readable storage medium coupled to the processor, the computer program code interacting with a plurality of computer operations and comprising instructions executable by the processor and configured to cause the processor to
   collect data associated with the first environmental characteristic from the one or more sensors,
   transmit the data associated with the first environmental characteristic to a cluster lead node using the wireless network interface, wherein the information handling system is a member of a local cluster of nodes in the wireless mesh network and the cluster lead node is the lead node of the local cluster of nodes, and
   transmit a first threshold exceeded message to the cluster lead node when the data associated with the first environmental characteristic exceeds a threshold associated with the first environmental characteristic; and wherein
   the cluster lead node generates a mapping of the first environmental characteristic, the mapping representing the first environmental characteristic across the local cluster of nodes, the mapping being performed in response to receipt of the data associated with the first environmental characteristic, the mapping representing when the first environmental characteristic exceeds the threshold associated with the first environmental characteristic based upon the first threshold exceeded message.

2. The information handling system of claim 1 wherein the first environmental characteristic comprises one of processor temperature;
   air inlet temperature;
   exhaust temperature;
   ambient temperature;
   humidity; and
   fan speed.

3. The information handling system of claim 1, wherein the local cluster of nodes in the wireless mesh network comprises one or more mesh network nodes within a fixed radius of the cluster lead node.

4. The information handling system of claim 1 wherein the cluster lead node is configured to communicate directly with each node in the local cluster of nodes and directly with cluster lead nodes of neighboring clusters.

5. The information handling system of claim 4, wherein the cluster lead node is further configured to communicate with a data center management server.

6. The information handling system of claim 1, wherein the instructions executable by the processor further comprise instructions configured to cause the processor to:
- receive, via the wireless network interface, from the cluster lead node, a command to adjust an operational parameter in response to the data associated with the first environmental characteristic; and
- adjust the operational parameter in response to the command.

7. The information handling system of claim 6 wherein the operational parameter comprises one or more of a periodicity of sensor measurements of the first environmental characteristic, a granularity of sensor measurements of the first environmental characteristic, and a speed of a fan in an enclosure of the information handling system.

8. The information handling system of claim 1, further comprising:
- transmitting the cluster mapping of the environment characteristic to a data center management server; and,
- generating a global mapping of the data center for the environmental characteristic from cluster mapping from the cluster lead node.

9. The information handling system of claim 8, further comprising:
- generating a global mapping of the data center for the environmental characteristic from cluster mapping from a plurality of cluster lead nodes.

10. The information handling system of claim 8, wherein:
- the data center management server assemble the global mapping by having relative locations of all the clusters through the location protocols of the wireless mesh network.

11. The information handling system of claim 10, wherein:
- the relative locations of all the clusters are assembled using location protocols of the wireless mesh network.

\* \* \* \* \*